United States Patent [19]
Gutridge

[11] Patent Number: 4,951,416
[45] Date of Patent: Aug. 28, 1990

[54] NUTRIENT SUPPLY SYSTEM FOR HYDROPONIC SYSTEMS

[76] Inventor: Dale H. Gutridge, 9410 Placid Way, Howell, Mich. 48843

[21] Appl. No.: 343,899

[22] Filed: Apr. 26, 1989

[51] Int. Cl.$^5$ .......................... A01G 9/24; A01G 31/02
[52] U.S. Cl. .......................................... 47/62; 47/39; 47/79; 47/82
[58] Field of Search ...................... 47/32, 48.5, 62, 79, 47/82, 39

[56] References Cited

U.S. PATENT DOCUMENTS 2,131,743  12/1934  Loughridge .
2,486,512  11/1949  Armstrong .............................. 47/79
4,302,906  12/1981  Kawabe et al. .
4,676,023   6/1987  Mori ..................................... 47/48.5

FOREIGN PATENT DOCUMENTS 238945   3/1969  U.S.S.R. .
386607   8/1973  U.S.S.R. .
1098876 11/1982  U.S.S.R. .

OTHER PUBLICATIONS

Automatic Sub-Irrigations Sand Culture Technique for Comparative Studies in Plant Nutrition, Andrew, vol. 23, No. 1, (Jan., 1974), Laboratory Practices Science.
Automatic Irrigation of Sand Cultures mechanism, Lott, Jul. 1, 1938, pp. 17, 18.

Primary Examiner—David A. Scherbel
Assistant Examiner—Michele A. Van Patten
Attorney, Agent, or Firm—Dykema Gossett

[57] ABSTRACT

A hydroponic system is disclosed that consists of a novel nutrient supply system. An air pump is connected into an air line that extends into a nutrient solution container. A nutrient solution supply line extends from the nutrient solution container, and a nutrient solution return line extends back into the nutrient solution container. The return line will be connected to the lowermost vertical extent of the plant containers and will return any excess nutrient fluid back into the nutrient supply system. A flap valve is disposed on the return line within the fluid container and will increase the efficiency of the pumping of the nutrient fluid. The nutrient solution return line, the nutrient solution supply line and the high-pressure air line are all connected into a T-connector. A small opening is formed in the T-connector adjacent the connection of the return line and the T-connector. The flow of high-pressure air into the T-shaped connector will cause a jet or venturi effect that will draw fluid into the small opening and in addition will entrain some returning fluid upwardly into the nutrient solution supply line and therethrough to the plant containers of the system. Two embodiments of plant containers are disclosed.

12 Claims, 2 Drawing Sheets

NUTRIENT SUPPLY SYSTEM FOR HYDROPONIC SYSTEMS

BACKGROUND OF THE INVENTION

This invention relates to a nutrient supply system for hydroponic systems. In particular, this invention relates to a nutrient supply system that utilizes only an air pump to supply nutrient solution to a hydroponic system.

Hydroponics is the science of growing plants without soil. In recent years, hydroponics has become much more popular due to the limited space in most urban environments. Hydroponic systems offer an economical solution that will allow the utilization of unused space such as the rooftops of urban buildings, or other available space.

A hydroponic system typically has two main parts, a plant container, and a nutrient supply system to supply nutrients and water to the plant container. In the development of early hydroponic systems that would produce consistently, a number of problems arose. Early systems had problems in continuously supplying, and accurately metering, nutrient solution to the plant containers. It is important that the proper amount of nutrients, which are normally in a water base, are supplied to the plants. Also, a gentle, predictable flow of nutrients is desirable. Of course, if too little solution is supplied the plants will die.

Thus, it is important that a nutrient supply system for a hydroponic system be able to supply sufficient solution to feed the plants while at the same time accurately meter the amount of solution to ensure that too much solution is not supplied to the plants.

It is also important that all components of a hydroponic system be economical. Any practical hydroponic system must be inexpensive and reliable.

Most early nutrient supply systems utilized chemical feed pumps to supply the nutrient solution directly to plant containers. Chemical feed pumps are notoriously complicated and require that extreme measures to be taken to ensure that the pump motor is sealed from the nutrient solution. The nutrient solution is corrosive to the motor of the pump, and it is necessary that the pump chamber be completely sealed from the motor chamber. This results in a complex and costly pumping system. Also, these pumps often supply unnecessarily large amounts of fluid. For this reason, air pumps were utilized to supply air as a motive fluid to move the nutrient solution to the plant container.

In Soviet Pat. No. 238,945, a nutrient supply system is disclosed wherein the nutrient chamber is sealed off by a diaphragm and high-pressure air is sent to the top of the diaphragm, thus pushing it downwardly upon the nutrient solution. The downward force of the air pressure against the diaphragm caused the nutrient solution to be driven through a supply line to the plant containers of the hydroponic system. This type of supply system avoided the problems inherent in a system utilizing a chemical feed pump; however, problems still remained with this system. It is difficult to accurately meter the fluid with this type of supply system, since many variables are involved. The height of the nutrient container creates gravity force that could end up supplying some nutrient fluid to the plant containers. In addition, the relative strength of the diaphragm, the density of the nutrient solution and the exact pressure of the high-pressure air utilized to move the fluid must all be considered when attempting to accurately meter the nutrient solution. These variables could result in an unexpectedly large amount of nutrient solution being sent to the plant containers or, alternatively, an insufficient amount being sent to the plant containers.

A further problem with a system such as illustrated by Soviet Pat. No. 238,945 is that the chamber to which the high-pressure air is sent must be perfectly sealed in order to ensure that the desired pressure is maintained within the chamber.

Another supply system is shown in Soviet Pat. No. 1,099,876. This system is similar to that shown in the previous Soviet patent; however, it does not use a diaphragm to seal the nutrient chamber. High-pressure air is communicated directly to the top of the nutrient solution. This eliminates the problem of considering the diaphragm strength when determining the amount of pressurized air to be sent to the container to accurately meter the fluid. However, the other problems still remain. Namely, the elevation of the nutrients container, the exact pressure of the high-pressure air entering the system, and the densities of the nutrient solution are all factors which determine how much of the nutrient solution is being sent to the plant containers. Also, the high-pressure air chamber must still be sealed from leaking to the atmosphere in order to accurately meter the solution.

Another type of supply system is illustrated in the article "A Mechanism for the Automatic Irrigation of Sand Cultures." This article was published in the July 1, 1938 issue of Science at page 17. In this system, the top of a nutrient container has a stopper which has a fluid supply line, a fluid return line and an air pressure line extending through it. This type of supply system is similar to the previously-described Soviet Pat. No. 1,099,876. In addition to having the problems associated with the Soviet reference, this system utilizes an extremely complex control for regulating the flow of air to the system and is thus undesirable.

Soviet Pat. No. 386,607 shows an alternative type of nutrient supply system where a pressure air line is communicated to the bottom of a nutrient supply container to drive nutrient solution up a supply line. This type of system, known as a "bubble-up" pumping system is inherently difficult for accurate metering of fluid. In particular, the distance between the supply tube bottom and the container wall, the relative densities of the fluid and the air, and the exact amount of air being sent to the system would all be factors that would need to be considered in accurately metering the fluid. In addition, the Soviet reference does not show any means for returning the nutrient solution from the plant containers back to the nutrient container. If there is some means for returning the solution, the container cannot be completely sealed off as it is apparently illustrated as being. The return flow of fluid to the solution would increase the amount of air in the solution, thus lowering the efficiency of this type of pumping mechanism.

A nutrient supply system is illustrated in U.S. Pat. No. 4,302,906. In this patent, a system is disclosed in which air is communicated to the bottom of a tube to "bubble-up" the nutrient solution within the tube. A return line is also included to return fluid back to the system. This type of system has all the problems noted with Soviet Pat. No. 386,607.

Another type of pumping arrangement that has been utilized to move nutrient solution is a venturi or jet pump. This type of pump can be understood from U.S. Pat. No. 2,131,743. In this patent, high-pressure air is sent through a venturi nozzle and a line to a pump fluid is disposed downstream of this nozzle. The fluid is drawn up the line and entrained along with the high-velocity jet that is created by the nozzle. In this type of pump, the elevation of the fluids is not normally a concern, and it is not necessary that the entire chamber be air tight. For these reasons, this type of pump is useful for accurately metering an amount of fluid to be pumped. This patent, however, does not disclose the use of this type of pump in any type of nutrient supply system.

The use of a venturi or jet pump with a nutrient supply system for hydroponic systems is illustrated in an article entitled "Automatic Subirrigation Sand Culture Technique for Comparative Studies in Plant Nutrition." This article was published in *Laboratory Practices*, Vol. 23, No. 1, January 1974 at pp. 20–1. In this system, a nutrient supply container has a single line leading to a plant container. A jet of high-pressure air is communicated to the line at a point between the nutrient container and the plant container. This jet of fluid accurately meters nutrient solution from the nutrient solution container to the plant container. However, this single line is utilized as both a supply and a return line. In addition, since the high-pressure air line is communicated to the supply line outside the container, a relatively complex system results. It is to be understood that these lines are rather delicate, and it is undesirable to have them positioned outside of the container since they can be easily jostled and disconnected. In addition, having the air supply line entering a flexible tube is undesirable since the relative position of the air line within the flexible tube can easily change. It is important that the air line be accurately positioned with respect to the fluid supply tube to ensure proper metering of the fluid.

It is also undesirable to return the nutrient solution through the same line that is supplying the solution. Since the above system utilizes only one line the pump will frequently end up supplying only returning solution. This returning solution normally has a lower nutrient concentration than the solution in the nutrient solution container.

Another problem with utilizing a venturi or jet pump for supplying nutrient solutions is that the narrow fluid supply line can easily become encrusted with the nutrient solution.

It is therefore an object of the present invention to disclose a relatively simple nutrient supply system for use with hydroponic systems.

It is further an object of the present invention to disclose a nutrient supply system that will accurately meter the nutrient solution to the plant containers.

It is further an object of the present invention to disclose such a nutrient supply system that will be relatively sturdy and not easily jostled so as to interfere with the accurate metering of the nutrient solution.

Moreover, it is an object of the present invention to create a system that is relatively inexpensive and requires little attention to ensure proper functioning.

SUMMARY OF THE INVENTION

A hydroponic system is disclosed that has plant containers and a nutrient supply system. The nutrient supply system utilizes a jet pump to supply nutrient solution to the plant containers.

An air pump supplies high pressure air to the nutrient solution through a stopper in the top of the nutrient solution container. The air pump sends the air through an air supply line to a connector mounted near the bottom of the nutrient solution container. A solution supply line leads from one end of the connector, extends through the stopper in the nutrient container and back vertically upwardly to the uppermost plant container. Thus, nutrient solution is supplied through the supply line to a plant portion of the uppermost plant container. A connection line leads from a drip pan beneath the uppermost plant container to a plant portion of the second uppermost plant container. A second connection line leads from the drip pan of this second uppermost plant container to the plant portion of the third uppermost plant container. There may be several additional plant containers in the system. A return line leads from the drip pan of the lowermost plant container, through the stopper in the neck of the nutrient solution container and back to the connector.

In one embodiment of the invention, the connector may be a T-connector. The return and supply lines are connected to the opposed connections of the T-connector. The air line is connected to the center connection, between the opposed connections.

A flap valve is inserted in the return line somewhere between the drip pan of the lowermost plant container and the connection of the return line to the T-connector. This flap valve ensures that the flow through the return line will only be from the plant containers back into the nutrient solution container.

A small opening is positioned in the T-connector adjacent the connection to the return line. This small opening acts as a nutrient solution supply to the jet pump and will draw solution from the solution container into a jet that is created by the high-pressure air.

The air pump utilized is a reciprocating-type compressor, thus resulting in alternate high and low pressures on the system. When the compressor is sending high-pressure air to the system, the jet will be created and air will be turned upwardly into the fluid supply line. Nutrient solution will be drawn into the small opening and entrained along with the air. The air will be turned into the supply line rather than the return line due to the presence of the flap valve. The valve prevents any backflow of air or fluid through that line and thus the path of least resistance for the air is the supply line. Any returning nutrient solution that is in the return line between the flap valve and the T-connector may be entrained along with the jet and the nutrient solution that is drawn in through the small opening. Due to the connection of the return line, there will be an adequate supply of nutrient solution near the opening to the jet to ensure that the system will always be supplying an adequate amount of nutrient solution to the plant containers.

When the air pump is not sending high pressure air to the system the returning solution will flow out of the small opening and into the solution container. This flow will clear any encrustation from the small opening.

A plant container mount is disclosed having a first upstanding pole and a series of support faces mounted at various vertical positions. These support faces each support a plant container. Each plant container has an upper plant portion and a lower drip pan. A nutrient solution container is positioned beneath the lowermost plant container.

In an alternative embodiment the plant container is disclosed as having a pair of downwardly extending ramps.

These and other objects and features of the present invention can be better understood upon a study of the following specification and appended drawings, of which the following is a brief description thereof.

BRIEF DESCRIPTION OF TUE DRAWINGS

DETAILED DESCRIPTION OF THE PREFERRED EMBODIMENTS

Figure 1:
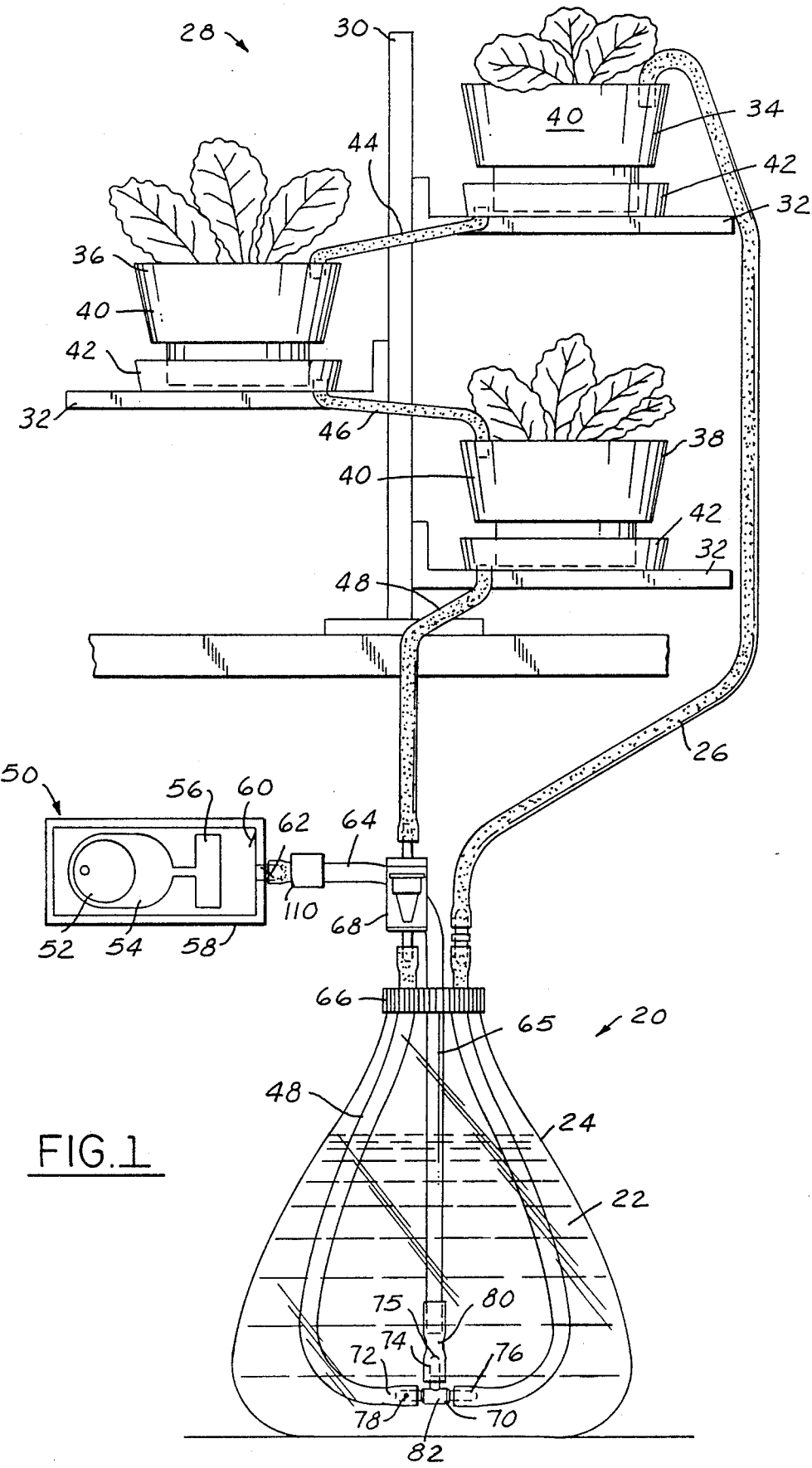
FIG. 1 illustrates a hydroponic system utilizing the nutrient supply system of the present invention.

As shown in FIG. 1, a nutrient supply system 20 is arranged to supply a nutrient solution 22 from a nutrient solution container 24 through supply tube 26 to the plant containers of hydroponic system 28. In this embodiment, hydroponic system 28 consists of a support pole 30 having support faces 32 mounted at various vertical and rotational positions relative to pole 30. The uppermost support face 32 supports a hydroponic plant container 34, the second uppermost support face 32 supports a hydroponic plant container 36, third support face 32 is illustrated as the lowermost member and supports a third hydroponic plant container 38. It is to be understood that several additional plant containers and support faces could be utilized with this system.

Each of the plant containers 34, 36, 38 consist of a plant-containing portion 40 and a drip pan 42 mounted beneath the plant-containing portion 40. It is to be understood that a fluid sent to the top of plant-containing portion 40 will drip down through the length of plant-containing portion 40 and into drip pan 42. A connection tube 44 connects drip pan 42 of plant container 34 to the top of plant-containing portion 40 of plant container 36. A second connection tube 46 connects the drip pan 42 of plant container 36 to the plant-containing portion 40 of plant container 38. A return tube 48 leads from the drip pan 42 of plant container 38 back into the nutrient solution container 24. Nutrient solution container 24 is disposed below the plant container in order to effect this return flow.

The nutrient solution container is preferably air-tight, thus affording easier control of the pressure within the container.

An air pump 50 is utilized with the nutrient supply system 20 and consists of an eccentric drive 52 having a crank arm 54 mounted to reciprocate piston 56 within cylinder 58. Any type of reciprocating piston pump is adequate. Rather than a rigid piston as is illustrated, the pump may have a diaphragm piston. Reciprocating diaphragm pumps are commonly used as aquarium air pumps, and are thus readily available.

An inlet flap valve 60 is mounted to regulate flow of air into cylinder 58, and an outlet flap valve 62 is used to regulate flow out of cylinder 58. When piston 56 is moving rearwardly within cylinder 58, flap valve 60 will open and allow air to enter cylinder 58. When the piston is reversed and begins to move forwardly within cylinder 58, flap valve 60 will be driven closed, and flap valve 62 will open, thus allowing high-pressure air to flow from cylinder 58 into an outlet line 64. From this description, it should be understood that line 64 will be alternatively receiving high-pressure air and then will be exposed to ambient pressure due to the alternate opening and closing of flap valve 62. A pressure control valve 110 is disposed on outlet line 64. Pressure control valve 110 is of a known type and allows precise control of the volume and pressure of the air in line 64.

Outlet air line 64 is connected to a straight air line portion 65 that is relatively rigid. Straight air line portion 65 extends through a stopper 66 mounted within the top of nutrient solution container 24. Return line 48 also extends through stopper 66 as does fluid supply line 26. Flap valve 68 is mounted on return line 48 at a position between plant container 38 and stopper 66.

The air line 65, fluid supply line 26, and return line 48 all come together at a connector member. A T-connector is illustrated, but a Y-connector could also be utilized.

A T-connector 70 interconnects return line 48, straight air line portion 65 and fluid supply line 26. T-connector 70 has a return line connection 72 that is connected to return line 48, an air line connection 74 that is connected to the straight air line portion 65, and a supply line connection 76 that is connected to supply line 26. Thus, the T-connector connects the three lines such that the return line 48 is opposed to, or facing, supply line 26, and the air supply line 65 is disposed intermediate the return line connection 72 and supply line connection 76. A small opening 78 is formed in T-connector 70 near the return line connection 72. A connector 80 may connect straight air line portion 65 to connection 74 on T-connector 70. The connection 74 may have a fluid passage 75 of smaller area than the air line 65. This smaller area fluid passage 75 creates a nozzle and will change the high-pressure air into a high-velocity jet of air and also ensure that the pressure of the air reaching the T-connector will be at a desired level and will not exceed a predetermined maximum level.

Lines 48 and 26 are preferably formed of flexible-type tubing. The flexible tubing allows the connection of the lines to the T-connector without any sharp bends that could create a restriction to flow. A bend could become clogged, much like a trap on a household drain. It is preferred that straight air line 65 and T-connector 70 are of rigid plastic construction. This will ensure that there will be no unwanted restrictions in the air line 65 or T-connector 20 and that the relative position of the straight air line portion 65 and the T-connector 70 will remain constant and thus will ensure that an operator can adequately predict the amount of nutrient solution 22 that the nutrient supply system 20 will send to the hydroponic system 28. However, it is to be understood that lines 48 and 26 could be formed of rigid tubing or line 65 could be formed of flexible tubing.

Figure 2:
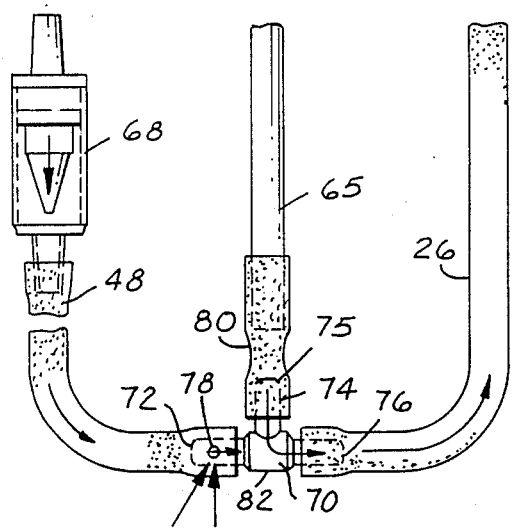
FIG. 2 is an enlarged view of the T-connector of the present invention at a time when the supply system is supplying nutrient fluid to the plant containers.

The operation of the nutrient supply system 20 of the present invention can be best understood from FIG. 2. FIG. 2 illustrates the nutrient supply system 20, and in particular the T-connector 70, at a time when air pump 50 is sending high-pressure air into straight air line portion 65. The high-pressure air is changed into a high-velocity jet near the connection 74. There may be returning fluid in the portion of line 48 intermediate flap valve 68 and return line connection portion 72 of T-connector 70. An opposed bottom portion 82 of T-connector 70 is described as the face opposite the position where straight air line portion 65 enters T-connector 70. Opposed bottom portion 82 will bend the air jet upwardly and into supply line 26. If smaller area fluid passage 75 is not used then this bending will "nozzle" the high-pressure air and create the high-velocity jet. The jet will tend to be turned into fluid supply line 26 rather than fluid return line 48 due to the presence of flap valve 68. That is, flap valve 68 will be closed and will resist flow of the jet into return line 48. Thus the jet will follow the path of least resistance that will lead it upwardly through supply line 26.

As illustrated in FIG. 2, an air jet, being shown by the relatively large arrows, has been bent by opposed bottom portion 82 upwardly into fluid supply 26. As is well known in jet pump technology, this will cause a relatively low pressure at a position directly behind the jet. Thus, nutrient solution 22 from container 24 will tend to be drawn inwardly through small opening 78 and be entrained along with the air jet. The nutrient solution is shown by the smaller arrows as entering small opening 78. In addition, any returning nutrient solution that is in line 48 intermediate closed flap valve 68 and the return line connection 72 will also tend to be drawn into the jet and entrained along with the air upwardly through solution supply line 26. The returning nutrient solution that is in this portion of line 48 ensures that an adequate amount of nutrient solution will be drawn upwardly by the nutrient supply system 20. In a sense, this returning solution acts as a priming fluid to ensure that there will be adequate flow to the hydroponic system 28.

The nutrient solution that is sent upwardly into solution supply line 26 is aerated by the air jet. In addition, the entrained returning solution is aerated and will also add air to the resulting solution that is sent to the plant containers. This is important since an aerated solution is much better utilized by a plant.

Figure 3:
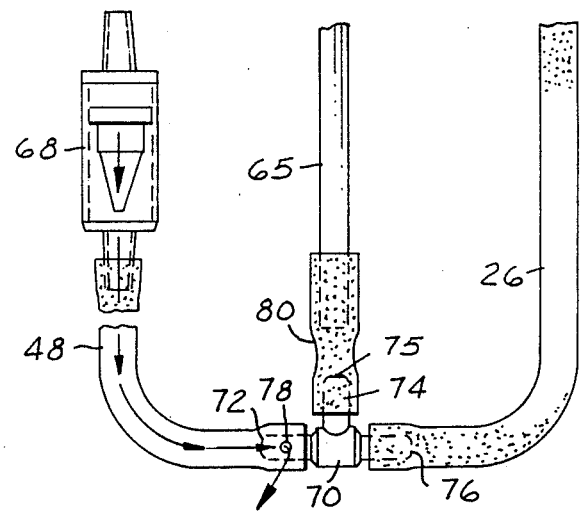
FIG. 3 is an enlarged view similar to FIG. 4, but showing the T-connector when the system is not supplying nutrient solution.

The operation of the system when the air pump 50 is not supplying pressurized air to air line 65 is illustrated in FIG. 3. This condition results when the pump is on its return stroke. As seen in FIG. 3, valve 68 is open and allows returning solution to flow through return line 48 into return line connection 72 of T-connector 70 and outwardly through small opening 78. The flow of returning nutrient solution through opening 78 will clear out any encrustation of nutrients within opening 78. As should be understood, opening 78 is very small and can easily become clogged.

When the returning solution exits opening 78, it will be adding a great deal of air to the nutrient solution 22 within nutrient solution container 24. This will ensure that the nutrient solution 22 is adequately aerated when supplied to the plant containers 34, 36, and 38.

In a preferred embodiment the T-connector, the nutrient solution return and supply lines, the air line, and the connection tubes are all formed of an opaque plastic. The opaque material lessens the growth of mold and algae.

Figure 4:
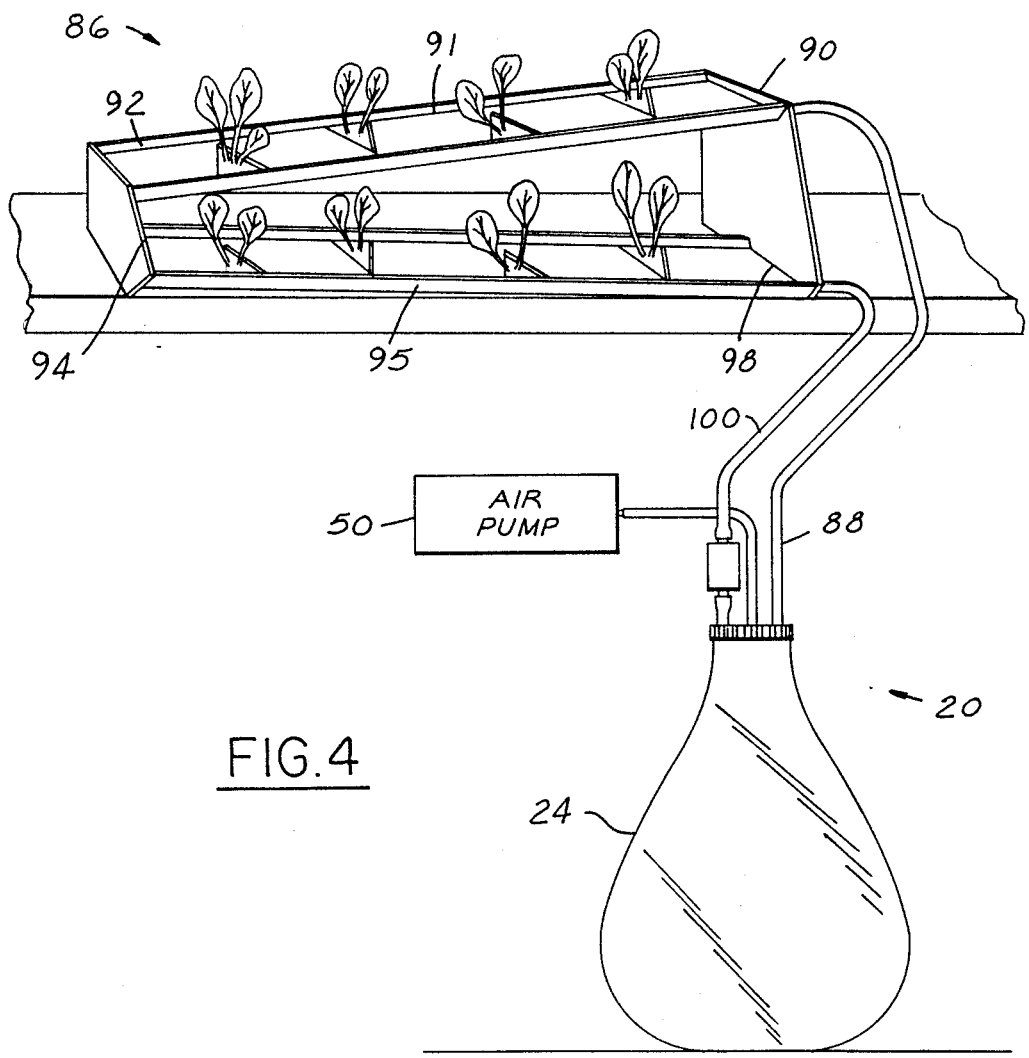
FIG. 4 is an alternative embodiment showing a second type of plant container system utilizing a nutrient supply system as disclosed by the present invention.

An alternative embodiment is illustrated with reference to FIG. 4. The nutrient supply system 20 is identical to that utilized with the first embodiment. The plant container 86 utilized in the second embodiment has a solution supply line 88 that enters at a first section 90 that is disposed at a vertically uppermost position of the plant container 86. From first section 90, a ramp 91 is angled vertically downwardly to a second section 92. Thus, the nutrient solution that enters through line 88 will tend to flow downwardly from section 90 to section 92. From section 92, the solution will flow laterally to a third section 94. Third section 94 may be slightly vertically beneath section 92, thus aiding the flow of solution between the two sections. From third section 94, the fluid will flow downwardly through a second ramp 95 to a fourth section 98 which is a vertically lowermost portion of plant container 86. From fourth section 98, a return line 100 returns the nutrient solution back down into the fluid container 24.

A preferred embodiment of the present invention has been disclosed; however, certain modifications will be obvious to one of ordinary skill in the art. Therefore, reference should now be had to the appended claims to determine the proper scope of this invention.

I claim:

1. A hydroponic system comprising:
   at least one plant container;
   a nutrient solution container containing a nutrient solution;
   an air pump supplying high-pressure air into an air line, said air line extending into said nutrient solution container;
   a nutrient solution supply line extending from said nutrient solution container to said plant container to supply nutrient solution to said plant container;
   a nutrient solution return line extending from said plant container into said nutrient solution container to return nutrient solution from said plant container back to said nutrient solution container; and
   a T-connector having a return line connection at one end, said return line connection being connected to said nutrient solution return line, a supply connection being connected to said nutrient solution supply line at an opposed end of said T-connector from said return line connection, and an air line connection connected to said air line at a position intermediate said return and supply line connections, said T-connector having a small opening adjacent said return line connection portion, said small opening communicating with said nutrient solution in said nutrient solution container.

2. A hydroponic system as recited in claim 1, and further wherein said return line has a flap valve disposed therein.

3. A hydroponic system as recited in claim 2, and further wherein said flap valve is disposed between said nutrient solution container and said plant container.

4. A hydroponic system as recited in claim 1, and further wherein said air line is a rigid plastic tube, said T-connector also being rigid plastic, said nutrient solution return and supply lines being plastic tubes that are relatively flexible with respect to said air line.

5. A hydroponic system as recited in claim 1, and further wherein said nutrient solution return line, said air line, said nutrient solution supply line, and said T-connector are all made of opaque plastic material.

6. A hydroponic system as recited in claim 1, and further wherein there are several of said plant containers, each of said several plant containers being mounted at a distinct vertical position, there being at least a vertically uppermost plant container, a next vertically uppermost plant container, and a vertically lowermost plant container, each of said several plant containers consisting of a plant-containing portion and a drip pan for receiving fluid from said plant-containing portion, said drip pan of a vertically uppermost plant container being connected by a tube to said plant-containing portion of said next vertically uppermost plant container, the drip pan of said vertically lowermost plant container being connected into said return line.

7. A hydroponic system as recited in claim 1, and further wherein said air pump is a reciprocating pump having an inlet and an outlet with flap valves disposed on both said inlet and outlet lines, said air line being connected to said outlet, said flap valve on said outlet causing alternate high and low pressures to be received within said air line.

8. A hydroponic system as recited in claim 1, and wherein said plant container is at a first vertical position and said nutrient solution container is at a second vertical position, said second vertical position being lower than said first vertical position.

9. A hydroponic system as recited in claim 1, and wherein said T-connector in disposed within said nutrient solution container.

10. A hydroponic system as recited in claim 1, and further wherein said plant container having four sections being connected together with vertically downwardly extending ramps, said four sections resulting in a ramp-like effect that connects said fluid supply line to said fluid return line.

11. A hydroponic system comprising:
a series of plant containers being mounted at distinct vertical positions, there being at least a vertically uppermost plant container and a vertically lowermost plant container each having a plant-containing portion and a drip pan mounted beneath said plant-containing portion, said drip pan receiving fluid from said plant-containing portion;
a nutrient solution stored within a nutrient solution container;
a nutrient supply system with an air pump having inlet and outlet flap valves mounted thereon, said air pump supplying high-pressure air to an air line, said air line having a straight portion extending into said nutrient solution container;
a nutrient solution supply line leading from said nutrient solution container into said plant-containing portion of said vertically uppermost plant container;
means to connect said drip pan of said vertically uppermost plant container to said plant-containing portion of said next vertically lowermost plant container;
a nutrient solution return line leading from said drip pan of said vertically lowermost plant container back into said nutrient solution container;
a T-connector disposed within said nutrient solution container, said T-connector having three connection portions, a return line connection portion being connected to said nutrient solution return line, a supply line connection being connected to said nutrient solution supply line at an opposed end of said T-connector from said return line connection, an air line connection of said T-connector being intermediate said return and supply line connections and being connected to said air line straight portion, said T-connector further having a small opening into said nutrient solution container at a position between said return line connection and said air line connection; and
said return line having a flap valve blocking flow of solution back through said return line, said flap valve being mounted between said nutrient fluid container and said lowermost plant container, said nutrient solution return line, said air line straight portion and said nutrient solution supply line, and said T-connector all being formed of opaque material, said air line straight portion and said T-connector being relatively rigid and said nutrient solution return and supply lines being relatively flexible.

12. A hydroponic system comprising:
at least one plant container;
a nutrient solution container containing a nutrient solution ;
an air pump supplying high-pressure air into an air line, said air line extending into said nutrient solution container, said air line having a nozzle to create a jet;
a nutrient solution supply line extending from said nutrient solution container to said plant container to supply nutrient solution to said plant container;
a nutrient solution return line extending from said plant container into said nutrient solution container to return nutrient solution from said plant container back to said nutrient solution container said return line having a flap value disposed; and
a connector disposed within said nutrient solution container having a return line connection, said return line connection being connected to said nutrient solution return line, a supply connection being connected to said nutrient solution supply line, and an air line connection connected to said air line, said connector having a small opening adjacent said return line connection portion, said small opening communicating with said nutrient solution in said nutrient solution container.

* * * * *

UNITED STATES PATENT AND TRADEMARK OFFICE
CERTIFICATE OF CORRECTION

PATENT NO. : 4,951,416

DATED : 8/28/90

INVENTOR(S) : Dale Gutridge

It is certified that error appears in the above-identified patent and that said Letters Patent is hereby corrected as shown below:

In column 10, line 41, please delete "value" and add --valve-- and after the word "disposed", please add --therein--.

Signed and Sealed this

Eleventh Day of February, 1992

*Attest:*

HARRY F. MANBECK, JR.

*Attesting Officer*     *Commissioner of Patents and Trademarks*